United States Patent
Prettyjohns et al.

Patent Number: 5,729,336
Date of Patent: Mar. 17, 1998

[54] APPARATUS AND METHOD FOR CHARACTERIZING THE LUMINOUS INTENSITY OF A LAMP USING A CURVED MIRROR AND CURVED SCREEN

[75] Inventors: Keith N. Prettyjohns; Stephen L. Marcus; Kevin J. Garcia, all of Tucson, Ariz.

[73] Assignee: Photometrics, Ltd, Tucson, Ariz.

[21] Appl. No.: 643,574

[22] Filed: May 6, 1996

[51] Int. Cl.$^6$ .................................................. G01J 1/00
[52] U.S. Cl. ................................................................ 356/121
[58] Field of Search .................................... 356/121, 122, 356/123

[56] References Cited

U.S. PATENT DOCUMENTS

| | | | |
|---|---|---|---|
| 1,266,525 | 5/1918 | Otte | 356/121 |
| 2,167,803 | 8/1939 | Graham et al. | 356/121 |
| 2,291,114 | 7/1942 | Squyer | 356/121 |
| 4,948,249 | 8/1990 | Hopkins et al. | 356/121 |
| 5,504,574 | 4/1996 | Murata | 356/121 |

OTHER PUBLICATIONS

Advances in Measurement Technologyfor Vehicle lighting Systems by Ian Lewin, Automotive Design Advancements in Human Factors; Improving Driver's Comfort and Performance; International Congress and Exposition, Detroit, Michigan, Feb. 26–29 1996, pp. 107–114.

Primary Examiner—Frank G. Font
Assistant Examiner—Amanda Merlino
Attorney, Agent, or Firm—Herbert M. Shapiro

[57] ABSTRACT

Apparatus for determining the luminous intensity distribution of an automotive head light employs a curved mirror and a curved screen. A solid state camera is used to obtain a pattern of the head light output from the screen. The system requires a relatively small black box into which the head light output is directed. A beam splitter may be employed to relax the constraints on the positioning of the various components within the box. The setting of the test lamp to first and to second preset lateral angular positions at each of which a pattern is captured and the combining of the two patterns permits the use of components which are practical. The use of a linear CCD array permits economies to be obtained by rotating the test lamp or the linear array over a sequence of angular positions and by constructing a composite pattern from the patterns so generated.

14 Claims, 3 Drawing Sheets

APPARATUS AND METHOD FOR CHARACTERIZING THE LUMINOUS INTENSITY OF A LAMP USING A CURVED MIRROR AND CURVED SCREEN

FIELD OF THE INVENTION

This invention relates to luminous intensity measurement instruments and more particularly to such instruments which are useful for characterizing the luminous intensity of automotive lamps such as head lights, tail lights, signal lights and the like.

BACKGROUND OF THE INVENTION

Automotive head lights are required to meet certain luminous intensity requirements established by government agencies. Accordingly, each new head light design has to be characterized in order to establish that it meets government standards. That is to say, the luminous intensity of the head light has to be characterized prior to production and production runs have to be sampled to ensure compliance.

Standard practice in the automotive field is to employ a goniometer and to move the test lamp in a manner to ascertain the luminous intensity at, for example, each of twenty-six different angles. The system uses a single point photodetector which is placed at least sixty feet from the lamp (head light) being characterized in a totally dark room. The minimum distance requirement is imposed because the lamp is not a point source and the light from an area source at any given angle has to be measured at a very large distance in order to correctly ascertain the luminous intensity at that angular position.

This standard practice requires a dark room of considerable size (over sixty feet) and takes a considerable amount of time. As a consequence, it is impractical to characterize each head light in a production line and compromises are made which result in inaccuracies in measurements and in aiming head lights when installed.

New systems are being proposed to reduce the size of the dark room required and to speed up the time for characterizing a lamp. One such system employs a screen in front of a head light and uses a cooled charge coupled device (CCD) to take a picture of the screen. This system still requires a totally dark room, a distance of sixty feet, and a screen at least seventy feet wide although it is argued that if a lesser distance of fifteen to thirty feet were used, the loss in accuracy would be acceptable. A system of this type is described in Advances in Measurement Technology for Vehicle Lighting Systems by Ian Lewin, Automotive Design Advancements in Human Factors; Improving Driver's Comfort and Performance; International Congress and Exposition; Detroit, Mich., Feb. 26-29, 1996.

BRIEF DESCRIPTION OF THE INVENTION

In accordance with the principles of the present invention the luminous intensity of a lamp (illustratively a head light) is ascertained using a black box measuring only about six feet by four feet by four feet. The system employs a spherical mirror which focuses the light from the head light onto a spherical screen. A CCD camera (preferably but not necessarily cooled) is used to take a picture of the screen to determine the luminous intensity pattern of the head light. The output of the CCD camera is stored and processed to provide the desired characterization of the head light. The system employs a beam splitter to permit the placement of the screen and the camera in convenient out of the way positions. The system not only permits the reduction in the size of the dark room but also reduces the amount of time for characterization of a head light to a level which may permit the characterization of head lights in a production line. The system provides for the movement of a test head light to at least two different preset lateral angular positions at each of which the characterization is determined.

DETAILED DESCRIPTION OF ILLUSTRATIVE EMBODIMENTS OF THIS INVENTION

Figure 1:
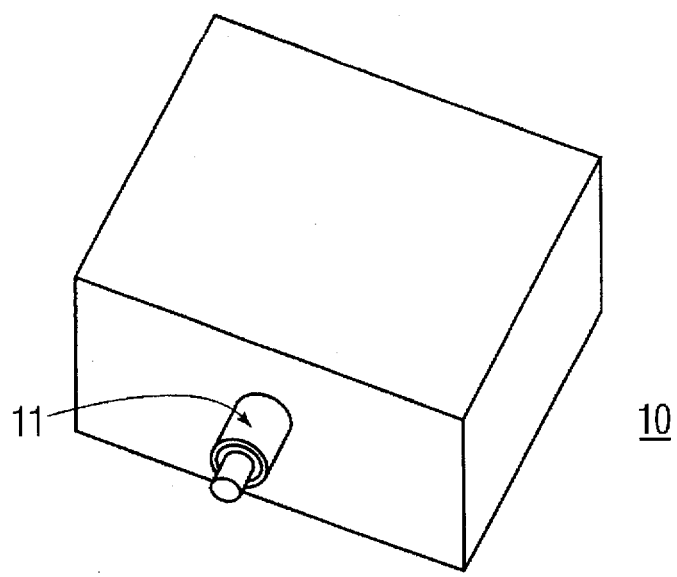
FIG. 1 is a schematic representation of a system for characterizing automobile head lights in accordance with the principles of this invention.

FIG. 1 shows a sealed box 10 in accordance with the principles of this invention. The box has a black interior surface and a port 11 into which light from a test head light is directed. The box is about six feet deep and six feet on a side.

Figure 2:
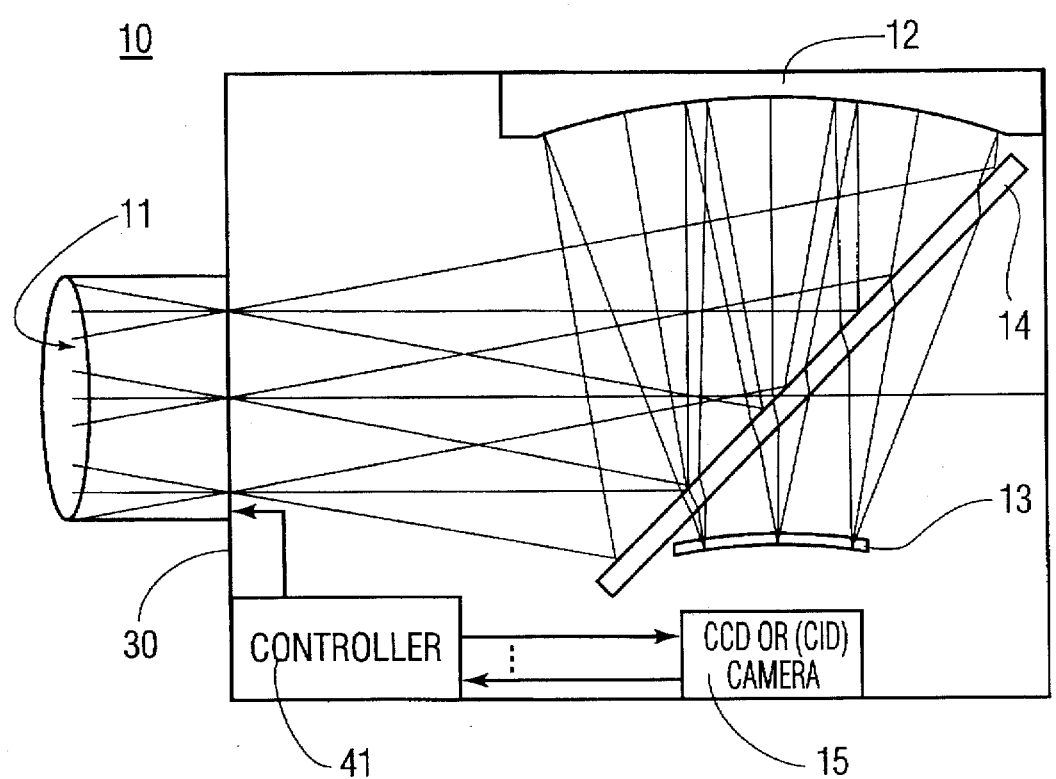
FIG. 2 is a schematic representation of the optical subsystem and electronic pattern capturing subsystems of the system of FIG. 1.

FIG. 2 shows, schematically, the components of the optical subsystem and the image capturing subsystem for the system of FIG. 1. Specifically, box 10 includes a spherical mirror 12, a scatter plate, or screen 13, and a beam splitter 14. Beam splitter 14 is used primarily to ease the constraints in the placement of the mirror 12 and the screen 13 with respect to the test lamp. The beam splitter is preferably a 50/50 beam splitter and is formed on a membrane as will be discussed in more detail hereinafter. A solid state camera such as a charge coupled device (CCD) camera 15 is located to capture the light pattern formed (focused) on screen 13 by mirror 12. This system maps the true luminous intensity of the lamp at different angular directions onto the screen at corresponding spatial locations.

Mirror 12 is 1.3 meters wide with a 1.0 meter radius of curvature, ideally, in order to achieve a measurement range of thirty degrees to either side of the center line of the input port in the arrangement of FIG. 1. Such a mirror would cost about $500,000.00 using state of the art fabrication technology and is therefor impractical for the systems contemplated herein. But, by enabling the test lamp to be preset in each of two different rotational positions and by capturing the luminous intensities at each position and by stitching together, by software, the two patterns so captured, a range of rotation of only fifteen degrees to either side of the center line of input port 11 suffices to provide the requisite measurement range and requires a mirror which is much smaller and of acceptable cost for such systems.

Figure 3:
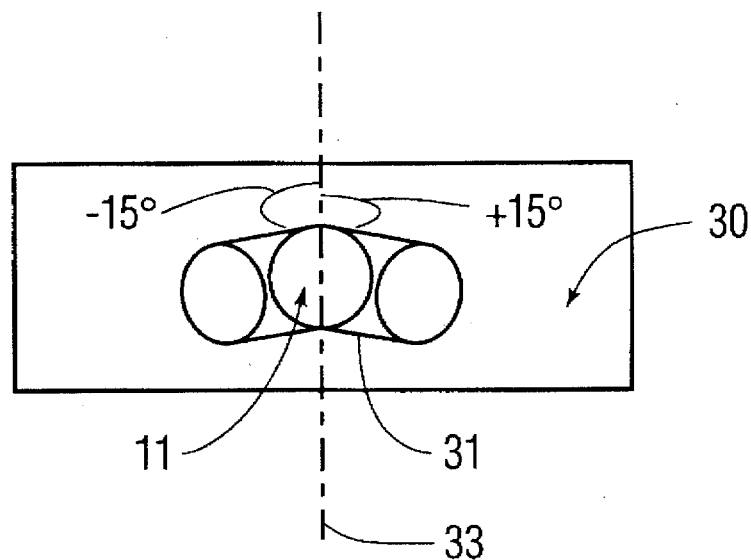
FIG. 3 is a schematic representation of a portion of the system of FIG. 1.

FIG. 3 shows the front face 30 of box 10 of FIG. 1 along with a mount 31 which is settable at, at least, first and second angles of fifteen degrees to the right and to the left with respect to the center line 33 of the input port as viewed in the figure. With the test lamp settable in each of the two positions described in connection with FIG. 2, mirror 12 need only be about 0.85 meters by 0.6 meters (vertical).

Mirror 12, in the preferred embodiment, is an electroformed mirror or speculum and is adjustable to compensate for any unwanted movement during shipment. Beam splitter 14 comprises a "pellicle" which is a membrane stretched on a frame and having a semi-reflective film deposited on the membrane. Both the mirror and the pellicle are available commercially. Although a speculum may introduce some error in resolution due to the nature of electroforming, the error is within the acceptable range of one tenth of one degree resolution required of systems of this type.

Screen 13 is a diffusing screen of ground glass, or translucent plastic. The screen preferably is spherical for systems which require high degrees of accuracy but could be a flat screen for less exacting lower cost systems. Relatively relaxed tolerances are permitted if the screen is curved.

The mirror is operative to focus all light from a test lamp, which emanates at a given angle, on a single spot on the screen (13). A head light, in order to meet U.S. government standards, is tested at twenty six different angles, as mentioned above. A solid state camera, such as a CCD camera is positioned in box 10 to capture a pattern of the luminous intensity distribution at each of the angle settings for a test head light, as discussed in connection with FIG. 2, under the control of a controller represented in FIG. 1 as block 41. That is to say, controller 41 is operative to set a test head light to a first angle, turn the head light on, and operate the camera to acquire the pattern focused on screen 13 by mirror 12 for processing. It is assumed that controller 41 may comprise any standard computer such as a personal computer (PC) which includes memory and is capable of storing and processing a sixteen bit signal representative of a pixel of the pattern acquired. To this end, the camera may comprise any (preferably cooled) commercially available CCD, Charge Injection Device (CID) or active pixel camera.

The operation of an illustrative CCD camera in such a system would be well understood by one skilled in the art and is described for head light image capture in the literature. Consequently, the operation of the CCD is not described in any further detail herein and is not necessary for an understanding of the present invention. The only exception is that two patterns are captured, in the preferred embodiment, and the camera subsystem needs to be able to combine the two patterns. The software to put the patterns together is discussed in connection with a flow diagram of the software hereinafter. Further, as is common of CCD systems, the camera has to be calibrated to compensate for variations in pixel sensitivity and offset characteristic of CCD cameras as is well understood in the art. In addition, the cameras must be calibrated against a known lamp standard (government accepted) in order to provide results tracable to a government approved standard for luminous intensity.

Figure 5:
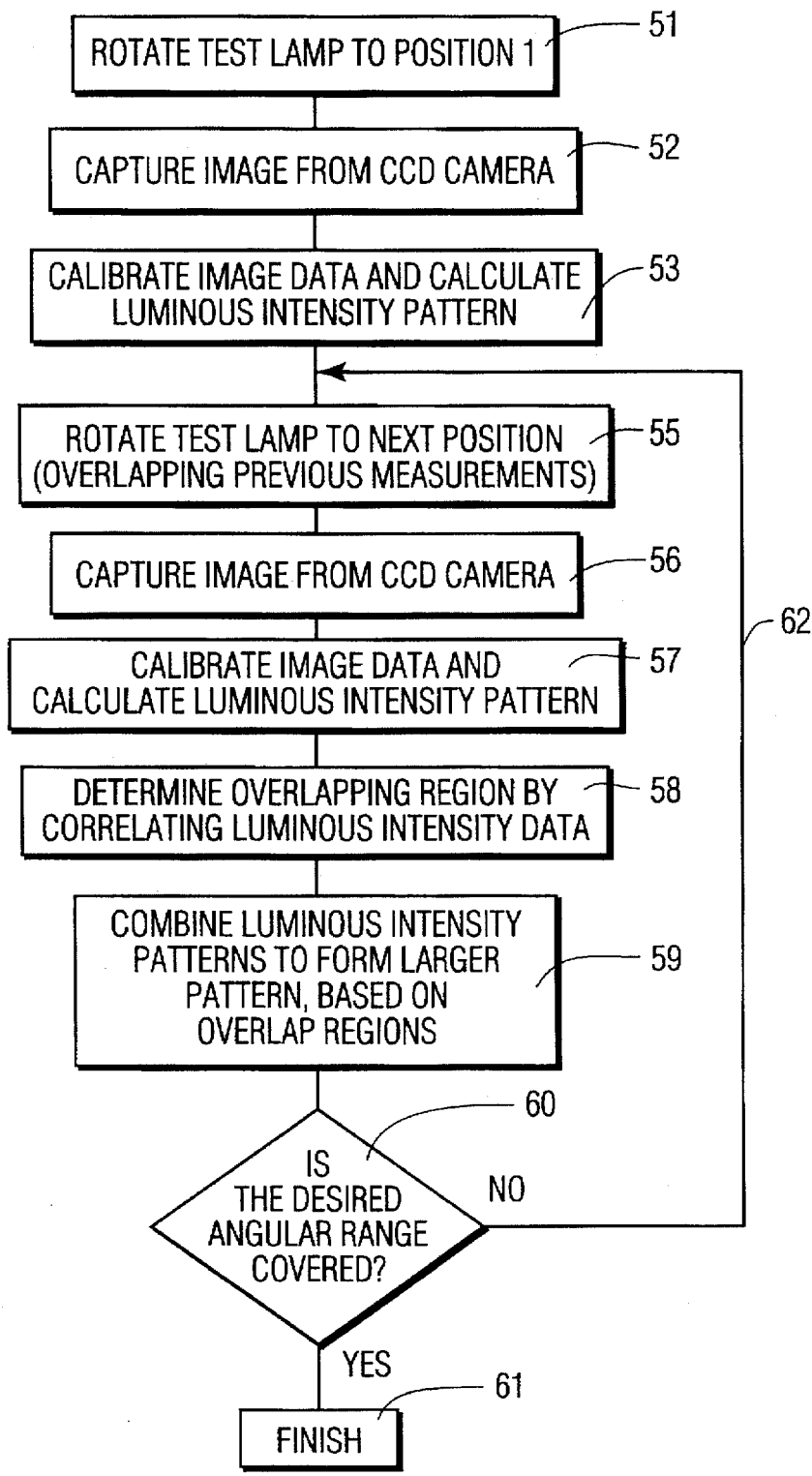
FIG. 5 is a flow diagram of the software for the pattern capturing subsystem of FIG. 2.

The software for combining the two patterns captured by camera 15 at the two different lateral angular settings described in connection with FIG. 2 is discussed in connection with the flow diagram of FIG. 5. Specifically, Controller 41 operates to set the test lamp to a first angular setting as indicated by block 51 of FIG. 5. Next, the controller activates camera 15 to capture the pattern at that angular setting as indicated by block 52. The image data is calibrated and the luminous intensity pattern is calculated as indicated by block 53.

Controller 41 next rotates the test lamp to a second angular setting as indicated by block 55, the second setting is set to provide a pattern which overlaps the first pattern to ensure that no gaps occur in the final pattern and to ensure that the patterns are easily correlated when combined. The pattern is then captured as indicated by block 56 and the pattern is again calibrated and the luminous intensity pattern is calculated as indicated by block 57. The overlap of the two patterns is then determined by correlating the luminous intensities of the two patterns as indicated by block 58. The luminous intensity patterns are then combined to form the integrated pattern based upon the overlap regions as indicated by block 59. If the desired angular range is covered, the pattern capturing procedure is completed as indicated by blocks 60 and 61. If not, the procedure returns to block 55 as indicated by arrow 62.

Figure 4:
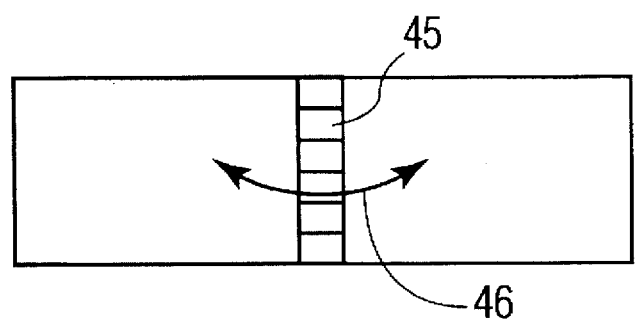
FIG. 4 is a schematic representation of an alternative pattern capturing subsystem for the system of FIG. 1.

A linear CCD array could be used along with a means for rotating the array to sweep out an angle equal to the sweep of the two settings discussed in connection with FIG. 2. FIG. 4 illustrates a linear CCD array (or photodiode array) 45 along with a means for rotating the array as represented by the double-headed arrow 46. Such means for rotating (scanning) a linear array are well known in the literature and, accordingly, are not described further herein.

The use of a linear CCD array permits the array to be rotated to capture the pattern of the luminous intensity distribution or, instead, to rotate the test lamp. In the latter case, the means for rotating described in connection with FIG. 3 is operative to move the test lamp incrementally through a sequence of angles along a rotational path under the control of controller 41 and the controller is also operative to synchronize the camera to acquire a pattern at each angle and to combine the patterns to form a single pattern.

A similar software procedure is carried out for systems employing a linear CCD array where the test lamp is rotated to a sequence of angular positions and a pattern is captured at each of the positions. In this case, a test lamp is set in each of the angular positions discussed in connection with FIG. 3 and then rotated under the control of controller 41 to consecutive angular positions for each of which a pattern is captured. The integrated patterns are then combined to produce an integrated pattern for the lamp.

A rectangular CCD array also can be used in systems in accordance with the principles of this invention. Such an array would be clocked with the rotation of a test lamp so that the intensity pattern on any row in the array is synchronized with the rotation of the lamp such that a given row always receives the corresponding luminous intensity pattern. The array is operated in the familiar Time Delay Integration (TDI) mode. This provides an improved signal to noise ratio for the measurement and hence increases the measurement accuracy.

What is claimed is:

1. Apparatus for characterizing the luminous intensity of a lamp, said apparatus comprising a black box with a port into which light output from a lamp to be characterized is directed, said apparatus including a curved mirror positioned in said box to receive the light output from a lamp at said port, said apparatus also including a curved screen positioned in said box in a position to receive the light output focused by said mirror for providing a luminous intensity pattern of said light output and a solid state camera positioned to acquire said pattern from said screen.

2. Apparatus as in claim 1 wherein said camera is a CCD camera.

3. Apparatus as in claim 1 wherein said camera is a cooled CCD camera.

4. Apparatus as in claim 1 wherein said camera is a CID camera.

5. Apparatus as in claim 1 wherein said mirror comprises an electroformed speculum, said apparatus also including a beam splitter positioned in said box to receive the light output from said lamp and for redirecting said light output to said mirror.

6. Apparatus as in claim 1 wherein each of said screen and said mirror is spherical.

7. Apparatus as in claim 5 also including means for rotating said lamp to each of at least two different angular positions.

8. Apparatus as in claim 6 also including means for rotating said lamp to each of at least two different preset angular positions.

9. Apparatus as in claim 2 also including means for rotating said lamp to a prescribed sequence of positions wherein said CCD camera is a linear CCD array camera, said apparatus also including means for synchronizing said means for rotating and said camera to capture a pattern from said screen and to read out said pattern from said camera at each of said sequence of positions.

10. Apparatus as in claim 6 wherein said camera comprises a linear CCD array, said apparatus also including means for rotating said array to a sequence of prescribed positions and means for synchronizing said means for rotating and said camera to capture a pattern from said screen and to read out said pattern from said camera at each of said sequence of prescribed positions.

11. Apparatus as in claim 8 wherein said camera comprises a linear CCD array, said apparatus also including means for rotating said test lamp to a sequence of angular positions, and means for synchronizing said means for rotating and said camera to capture a pattern from said screen at each of said sequence of angular positions.

12. The method of characterizing the luminous intensity distribution of a test lamp, said method comprising the steps of setting a test lamp at an input port of a test box including a curved mirror for focussing a pattern of the luminous intensity distribution of the lamp onto a curved screen and a solid state camera for capturing the pattern from the screen, said method also comprising the steps of setting said lamp to a first preset lateral angular position, turning on said lamp and reading out the pattern captured by said solid state camera, rotating said lamp to a second preset lateral angular position and capturing the pattern of the output from said lamp at said second position, and calculating a combined pattern from the patterns so captured.

13. A method as in claim 12 wherein said first and second preset lateral angular positions are arranged to produce overlapping patterns.

14. A method as in claim 12 wherein said test lamp is rotated to a sequence of angular positions wherein said camera includes a linear CCD array and each of said positions is synchronized with said linear CCD array.

* * * * *